(12) United States Patent
Soma et al.

(10) Patent No.: US 7,923,951 B2
(45) Date of Patent: Apr. 12, 2011

(54) VEHICLE POWER CONTROLLER

(75) Inventors: Takaya Soma, Toyota (JP); Hiroshi Yoshida, Anjo (JP); Takeshi Mogari, Nagoya (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/308,026

(22) PCT Filed: Jul. 2, 2007

(86) PCT No.: PCT/JP2007/063619
§ 371 (c)(1),
(2), (4) Date: Dec. 5, 2008

(87) PCT Pub. No.: WO2008/007626
PCT Pub. Date: Jan. 17, 2008

(65) Prior Publication Data
US 2009/0167217 A1      Jul. 2, 2009

(30) Foreign Application Priority Data
Jul. 10, 2006   (JP) ................. 2006-189408

(51) Int. Cl.
*H02M 3/18*   (2006.01)
*G05F 1/66*   (2006.01)

(52) U.S. Cl. ............... 318/376; 180/65.1; 180/65.29; 320/104; 320/166; 307/66

(58) Field of Classification Search ............... 318/139, 318/141, 375, 376; 180/65.1, 65.21, 65.24, 180/65.275, 65.29, 53.5; 320/103, 104, 107, 134, 166; 290/40 C; 701/22; 307/46, 48, 66

See application file for complete search history.

(56) References Cited

U.S. PATENT DOCUMENTS 5,397,991 A * 3/1995 Rogers .......................... 320/125
5,412,293 A   5/1995 Minezawa et al.
(Continued)

FOREIGN PATENT DOCUMENTS

JP          A-5-30608         2/1993
(Continued)

OTHER PUBLICATIONS

Office Action in Korean Patent Application No. 10-2009-7002346 (with English translation).

*Primary Examiner* — Walter Benson
*Assistant Examiner* — Eduardo C. Santana
(74) *Attorney, Agent, or Firm* — Oliff & Berridge, PLC

(57) ABSTRACT

An ECU executes a program including the steps of: calculating regenerative power value P based on a brake pressure; calculating limit charging power WIN(B) to a battery; calculating limit charging power WIN(C) to a capacitor; when it is determined that regenerative power value P is larger than the sum of WIN(B) and WIN(C), estimating that a large regenerative energy sufficient to fully charge the capacitor even if the battery is charged with priority would be generated; and transmitting a control signal to set output voltage of a boost converter to be not higher than the voltage of the capacitor so as to charge the battery with priority.

20 Claims, 6 Drawing Sheets

U.S. PATENT DOCUMENTS

| | | | |
|---|---|---|---|
| 5,488,283 A * | 1/1996 | Dougherty et al. | 307/10.1 |
| 5,778,326 A | 7/1998 | Moroto et al. | |
| 5,832,396 A | 11/1998 | Moroto et al. | |
| 7,023,107 B2 * | 4/2006 | Okuda et al. | 307/10.1 |
| 7,221,064 B2 * | 5/2007 | Okuda et al. | 307/10.1 |
| 7,417,407 B1 * | 8/2008 | Stuart et al. | 320/166 |
| 7,486,034 B2 * | 2/2009 | Nakamura et al. | 318/139 |
| 2004/0207205 A1 | 10/2004 | Kikuchi et al. | |
| 2005/0007049 A1 | 1/2005 | Kim | |
| 2007/0108936 A1 | 5/2007 | Yaguchi | |
| 2008/0211453 A1 * | 9/2008 | Przywecki | 320/104 |
| 2009/0167216 A1 * | 7/2009 | Soma et al. | 318/376 |
| 2009/0230908 A1 * | 9/2009 | Soma et al. | 318/452 |
| 2010/0076636 A1 * | 3/2010 | Ichikawa | 701/22 |

FOREIGN PATENT DOCUMENTS

| | | |
|---|---|---|
| JP | A-5-146009 | 6/1993 |
| JP | A-6-113407 | 4/1994 |
| JP | A-8-126116 | 5/1996 |
| JP | A-2000-188802 | 7/2000 |
| JP | A-2003-199203 | 7/2003 |
| JP | A-2004-320872 | 11/2004 |
| JP | A-2005-67559 | 3/2005 |
| JP | A-2005-160269 | 6/2005 |
| JP | A-2006-158173 | 6/2006 |
| KR | 10-2005-0005696 A | 1/2005 |
| WO | WO 2005/081395 A1 | 9/2005 |

* cited by examiner

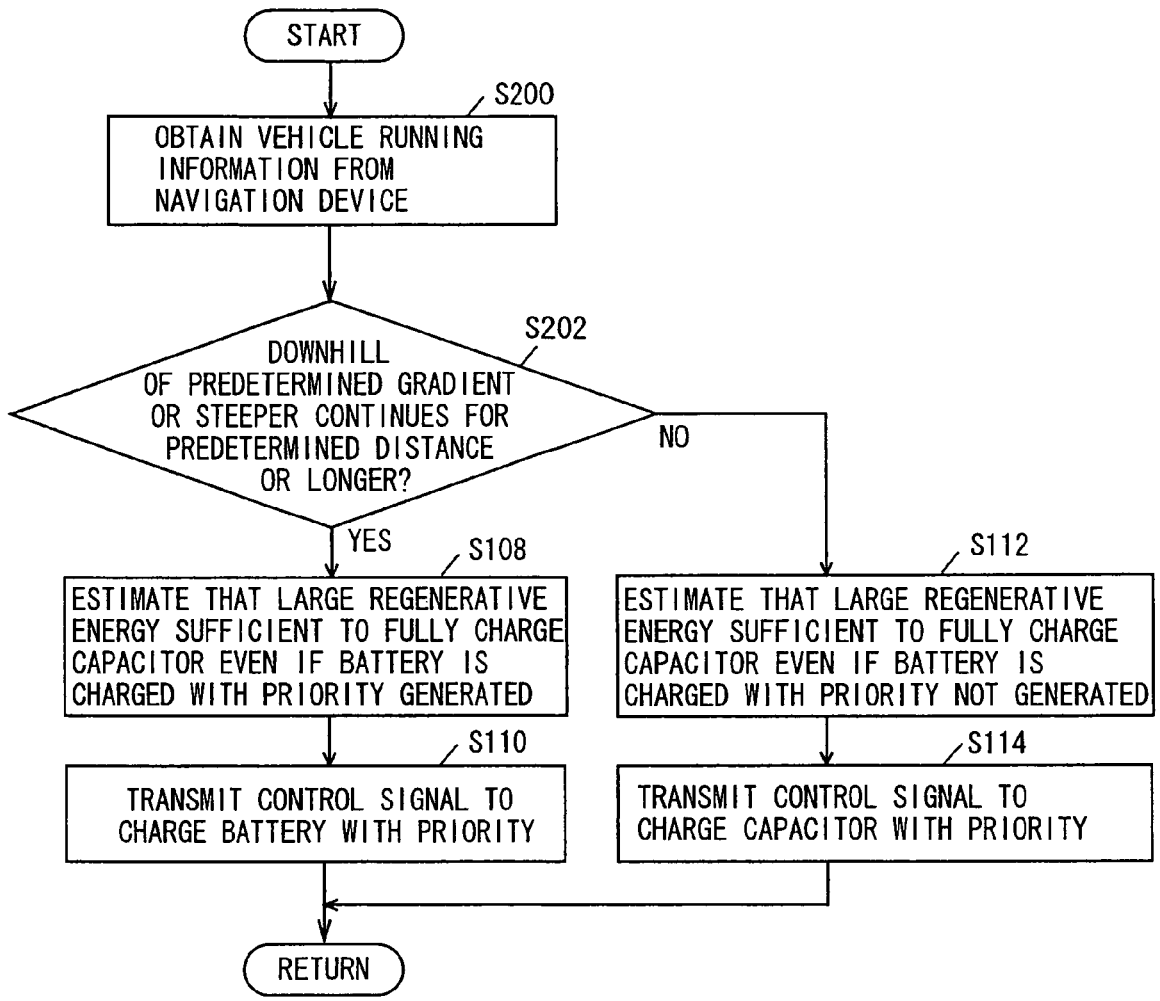

VEHICLE POWER CONTROLLER

TECHNICAL FIELD

The present invention relates to a power controller for a vehicle including a rotating electric machine for running that generates regenerative electric power at the time of regenerative braking and, specifically, to a power controller for a vehicle provided with a battery and a capacitor that are charged with the regenerative power.

BACKGROUND ART

A vehicle mounting a power train referred to as a hybrid system, in which an engine (possibly a known mechanism such as a gasoline engine or a diesel engine) and a motor are combined, has been developed and commercially available. Further, a vehicle (electric vehicle, fuel cell electric vehicle) mounting a power train using only the motor as the running source and not mounting any engine, has also been developed. Such a vehicle mounts an electric storage mechanism (a battery or a capacitor) for motor drive. At the time of acceleration of the vehicle, the motor is driven by the electric power supplied from the electric storage mechanism, to increase the vehicle speed. At the time of braking of the vehicle, the motor functions as a generator, and the generated regenerative energy is stored in the electric storage mechanism. Thus, the kinetic energy of the vehicle is recovered as electric energy, and the regenerative braking force acts on the vehicle. In a vehicle including a battery and a capacitor as electric storage mechanism, at the time of acceleration of the vehicle speed requiring instantaneous high output, it is preferred to supply electric power from the capacitor to the motor, as the capacitor has superior instantaneous output characteristic to the battery. If the capacitor is not sufficiently charged at the time of acceleration, however, it is impossible to supply sufficient electric power from the capacitor to the motor. Japanese Patent Laying-Open No. 05-030608 discloses a technique of charging the capacitor to be ready for vehicle acceleration, in an electric vehicle including a battery and a capacitor.

The hybrid system of electric vehicle disclosed in Japanese Patent Laying-Open No. 05-030608 is applied to an electric vehicle having a DC power source, a motor attached to a wheel, a converter connected to the DC power source and driving the motor, and a controller controlling the converter. The hybrid system includes a battery and a capacitor (a condenser of large capacity) as DC power sources, a switching unit for switching charging/discharging of the battery and the capacitor dependent on acceleration/deceleration, and a limiting unit limiting charging to the battery in a charging mode with regenerative braking, to increase the burden of rapid discharge/charge shared by the capacitor.

According to the hybrid system of electric vehicle disclosed in Japanese Patent Laying-Open No. 05-030608, in the charge mode with regenerative braking, the switching unit is controlled such that the burden of rapid discharge/charge shared by the capacitor having instantaneous output characteristic better than the battery is increased. Thus, rapid charging of the battery is avoided to reduce deterioration of the battery and, in addition, it becomes possible to charge the capacitor beforehand to be ready to supply power from the capacitor at the time of vehicle acceleration when instantaneous high output is required. Therefore, at the time of acceleration, it is possible to increase the vehicle speed with good response.

In the hybrid system for an electric vehicle disclosed in Japanese Patent Laying-Open No. 05-030608, however, it is not always possible to recover maximum regenerative energy. Specifically, if the regenerative energy is stored in the capacitor, the amount of charges to the battery is limited. In some situations in which regenerative energy is large, however, it is possible to charge the battery without limiting the charging amount and to fully charge the capacitor with extra electric power that cannot be stored in the battery any more. If the charging amount to the battery is limited in such a case, the amount of charges to the battery would decrease though the amount of charges to the capacitor is the same, and full recovery of regenerative energy becomes impossible.

DISCLOSURE OF THE INVENTION

The present invention was made to solve the above-described problem and its object is to provide a power controller for a vehicle including a battery and a capacitor, that ensures acceleration performance and allowing full recovery of regenerative energy.

The present invention provides a power controller for a vehicle including a rotating electric machine for running that generates regenerative power of a voltage higher than rated voltage of a secondary battery at the time of braking. The power controller includes: an inverter connected to the rotating electric machine and converting and outputting the regenerative power; a converter connected between the inverter and the secondary battery, converting the voltage of the converted regenerative power to a rated voltage of the secondary battery and outputting the resulting voltage; a capacitor connected between the converter and the inverter in parallel with the secondary battery, having larger rated charging/discharging power and smaller storage capacity than the secondary battery; a switching unit switched to charge either the secondary battery or the capacitor with priority; and an operation unit connected to the switching unit. The operation unit determines whether the regenerative power is not lower than a predetermined value, and controls the switching unit such that the secondary battery is charged with priority if it is determined to be not lower than the predetermined value, and the capacitor is charged with priority if it is determined to be lower than the predetermined value.

According to the present invention, the regenerative power generated at the time of braking is converted by the inverter, and stored with priority either in the secondary battery or the capacitor connected in parallel. At the time of vehicle acceleration that requires instantaneous high output, it is desired to supply electric power to the rotating electric machine for running from the capacitor, which has higher rated charging/discharging power and having better instantaneous output characteristic than the secondary battery. Therefore, to be ready for vehicle acceleration, it is possible to charge the capacitor with higher priority than the secondary battery. If the regenerative power is large, however, it may be possible to fully charge the capacitor having small storage capacity by extra electric power that cannot be stored in the secondary battery, even when the secondary battery is charged with priority. The fully charged state here refers to a state of charging with electric power equal to or larger than required to output the electric power as requested by the driver of the vehicle. The same applies to the following descriptions. If the capacitor is charged with priority even in such a situation, the amount of recovered regenerative energy decreases. Specifically, though the amount of charges to the capacitor is the same, charging to the capacitor is given priority and the start of charging to the secondary battery delays. Thus, the time for charging the secondary battery becomes shorter, resulting in smaller amount of charges in the secondary battery. In view of the foregoing, whether the regenerative power is equal to or higher than a predetermined value (for example, sum of upper limit control value of charging power to the secondary battery and the upper limit control value of charging power to the capacitor) is determined. If the regenerative power is equal to or higher than the predetermined value, the secondary battery is charged with priority. As a result, it becomes possible to fully charge the capacitor having small storage capacity with the extra electric power (exceeding the upper limit control value of charging power to the secondary battery), even when the secondary battery is charged with priority. As compared with the approach in which the capacitor is charged with priority, it becomes possible to charge the capacitor with the same amount of electric energy and to charge the secondary battery with larger amount of regenerative energy by enabling earlier start of charging to the secondary battery. Thus, it is possible to recover larger amount of regenerative energy while attaining sufficient acceleration performance. If the regenerative power is lower than the predetermined value, the capacitor is charged with priority. Therefore, the capacitor can be charged with larger amount of electric energy than when the secondary battery is charged with priority. Therefore, it is possible to have the capacitor charged in advance to be ready for instantaneous high output at the time of acceleration, and thus, sufficient acceleration characteristic can be attained. Thus, a power controller that ensures sufficient acceleration performance and allows full recovery of regenerative energy for a vehicle including a battery and a capacitor can be provided.

Preferably, the predetermined value is set based on a first upper limit control value of charging power to the secondary battery and a second upper limit control value of charging power to the capacitor.

According to the present invention, when the secondary battery is charged with priority, if the regenerative power value is larger than the first upper limit control value of charging power to the secondary battery, extra electric power that cannot be stored in the secondary battery any more is stored in the capacitor. If the value of extra electric power is close to or exceeding the second upper limit control value of charging power to the capacitor, it is possible to fully charge the capacitor in a short period of time. Thus, the predetermined value is set based on the first upper limit control value of charging power to the secondary battery and on the second upper limit control value of charging power to the capacitor. By way of example, the predetermined value is set as the sum of the first upper limit control value and the second upper limit control value. By this approach, if it is possible to fully charge the capacitor in a short period of time even after the secondary battery is charged with priority, the secondary battery can be charged with priority.

More preferably, the predetermined value is set to be the sum of the first upper limit control value and the second upper limit control value.

According to the presents invention, when the secondary battery is charged with priority, if the regenerative power value is larger than the first upper limit control value of charging power to the secondary battery, extra electric power that cannot be stored in the secondary battery any more is stored in the capacitor. If the value of extra electric power exceeds the second upper limit control value of charging power to the capacitor, it is possible to fully charge the capacitor in a short period of time. Therefore, the predetermined value is set as the sum of the first upper limit control value and the second upper limit control value. By this approach, if it is possible to fully charge the capacitor in a short period of time even after the secondary battery is charged with priority, the secondary battery can be charged with priority.

More preferably, the operation unit further calculates the regenerative power based on brake pressure of the vehicle.

According to the present invention, when the brake pressure of the vehicle is high, large regenerative power is generated as a large regenerative braking force corresponding to the brake pressure acts on the vehicle. Thus, the regenerative power is calculated based on the brake pressure of the vehicle. Therefore, the magnitude of energy of the regenerative power can be calculated appropriately.

According to another aspect, the present invention provides a power controller for a vehicle including a rotating electric machine for running that generates regenerative power of a voltage higher than rated voltage of a secondary battery at the time of braking. The power controller includes: an inverter connected to the rotating electric machine and converting and outputting the regenerative power; a converter connected between the inverter and the secondary battery, converting the voltage of the converted regenerative power to a rated voltage of the secondary battery and outputting the resulting voltage; a capacitor connected between the converter and the inverter in parallel with the secondary battery, having larger rated charging/discharging power and smaller storage capacity than the secondary battery; a switching unit switched to charge either the secondary battery or the capacitor with priority; and an operation unit connected to the switching unit. The operation unit estimates whether a large regenerative energy sufficient to charge the capacitor with electric energy not smaller than a predetermined value even if the secondary battery is charged with priority would be generated, and controls the switching unit such that the secondary battery is charged with priority if it is estimated that the large regenerative energy would be generated, and the capacitor is charged with priority if it is estimated that the large regenerative energy would not be generated.

According to the present invention, at the time of vehicle acceleration that requires instantaneous high output, it is desired to supply electric power to the rotating electric machine for running from the capacitor, which has higher rated charging/discharging power and having better instantaneous output characteristic than the secondary battery. Therefore, to be ready for vehicle acceleration, it is possible to charge the capacitor with higher priority than the secondary battery. If the regenerative energy is large, however, it may be possible to fully charge the capacitor having small storage capacity by extra electric power that cannot be stored in the secondary battery, even when the secondary battery is charged with priority. If the capacitor is charged with priority even in such a situation, the amount of recovered regenerative energy decreases. Specifically, though it is possible to fully charge the capacitor even if the secondary battery is charged with priority, charging to the capacitor is given priority and the start of charging to the secondary battery delays. Thus, the time for charging the secondary battery becomes shorter, resulting in smaller amount of charges in the secondary battery. Therefore, if it is expected that a large regenerative energy sufficient to charge the capacitor with electric energy equal to or larger than a predetermined value (for example, a value required to output the electric power as requested by the driver of the vehicle) be generated, the secondary battery is charged with priority. Therefore, as compared with the approach in which the capacitor is charged with priority with the electric energy stored in the capacitor being equal to or larger than the value sufficient to output the electric power as requested by the driver, it becomes possible to charge the secondary battery with larger regenerative energy, with the start time of charging made earlier. Thus, it becomes possible to recover larger regenerative energy while ensuring sufficient acceleration performance. On the other hand, if it is not expected that a large regenerative energy sufficient to charge the capacitor with electric energy equal to or larger than a predetermined value is generated, the capacitor is charged with priority. Therefore, the capacitor can be charged with larger amount of electric energy than when the secondary battery is charged with priority. Therefore, it is possible to have the capacitor charged in advance to be ready for instantaneous high output at the time of acceleration, and thus, sufficient acceleration characteristic can be attained. Thus, a power controller that ensures sufficient acceleration performance and allows full recovery of regenerative energy for a vehicle including a battery and a capacitor can be provided.

Preferably, the predetermined value is a value sufficient to output electric power corresponding to a request of a driver of the vehicle.

According to the present invention, even if the secondary battery is charged with priority, it is possible to output from the capacitor the electric power that meets the request (for example, acceleration request) of the vehicle driver.

More preferably, the operation unit further calculates the regenerative power based on brake pressure of the vehicle, and estimates whether the large regenerative energy would be generated or not, based on the calculated regenerative power.

According to the present invention, when the brake pressure of the vehicle is high, large regenerative power is generated as a large regenerative braking force corresponding to the brake pressure acts on the vehicle. Thus, the regenerative power is calculated based on the brake pressure of the vehicle. Further, if the regenerative power calculated based on the brake pressure of the vehicle is large, it is often the case that the driver requires braking force for a long period of time. Specifically, it is often the case that large regenerative energy generates as the large regenerative power continues for a long period of time. Therefore, whether a large regenerative energy would be generated or not is estimated based on the regenerative power calculated based on the brake pressure of the vehicle. Consequently, the magnitude of generated regenerative energy can appropriately be estimated.

More preferably, the operation unit estimates whether the large regenerative energy would be generated or not based on a first upper limit control value of charging power to the secondary battery and a second upper limit control value of charging power to the capacitor, in addition to the calculated regenerative power.

According to the present invention, when the secondary battery is charged with priority, if the regenerative power value is larger than the first upper limit control value of charging power to the secondary battery, extra electric power that cannot be stored in the secondary battery comes to be stored in the capacitor. If the value of extra electric power is close to or exceeding the second upper limit control value of charging power to the capacitor, it is possible to fully charge the capacitor in a short period of time. Therefore, whether a large regenerative energy would be generated or not is estimated based on the first upper limit control value and the second upper limit control value, in addition to the calculated regenerative power. By way of example, whether a large regenerative energy is generated or not can be estimated by comparing the sum of the first upper limit control value and the second upper limit control value with the calculated value of regenerative power. Thus, it is possible to more appropriately estimate the magnitude of generated regenerative energy.

More preferably, the operation unit estimates that the large regenerative energy would be generated if the calculated regenerative power value is larger than a sum of the first upper limit control value and the second upper limit control value.

According to the present invention, when the secondary battery is charged with priority, if the regenerative power value is larger than the first upper limit control value of the charging power to the secondary battery, extra electric power that cannot be stored in the secondary battery comes to be stored in the capacitor. If the value of extra electric power exceeds the second upper limit control value of the charging power to the capacitor, it is possible to fully charge the capacitor in a short period of time. Therefore, if the calculated value of regenerative power is larger than the sum of the first upper limit control value and the second upper limit control value, it is expected that large regenerative energy generates. Therefore, it is possible to estimate that large regenerative energy generates, when the capacitor can be fully filled in a short period of time even if the secondary battery is charged with priority.

More preferably, the operation unit estimates whether the large regenerative energy would be generated based on information from a navigation device.

According to the present invention, if the vehicle runs a long, steep downhill, for example, the driver often requires regenerative braking force that matches the inclination. Specifically, it is often the case that large regenerative energy generates as the large regenerative power continues for a long period of time. Therefore, whether a large regenerative energy would be generated or not is estimated based on the information from the navigation device. For instance, if the road condition on which the vehicle runs is determined from the vehicle running information obtained from the navigation device that the vehicle is running on a long, steep downhill, it is estimated that a large regenerative energy would be generated. Thus, it becomes possible to appropriately estimate the magnitude of regenerative energy to be generated.

BRIEF DESCRIPTION OF THE DRAWINGS

FIG. 8 is a flowchart representing a control structure of an ECU implementing the power controller in accordance with the second embodiment of the present invention.

BEST MODES FOR CARRYING OUT THE INVENTION

Figure 1:
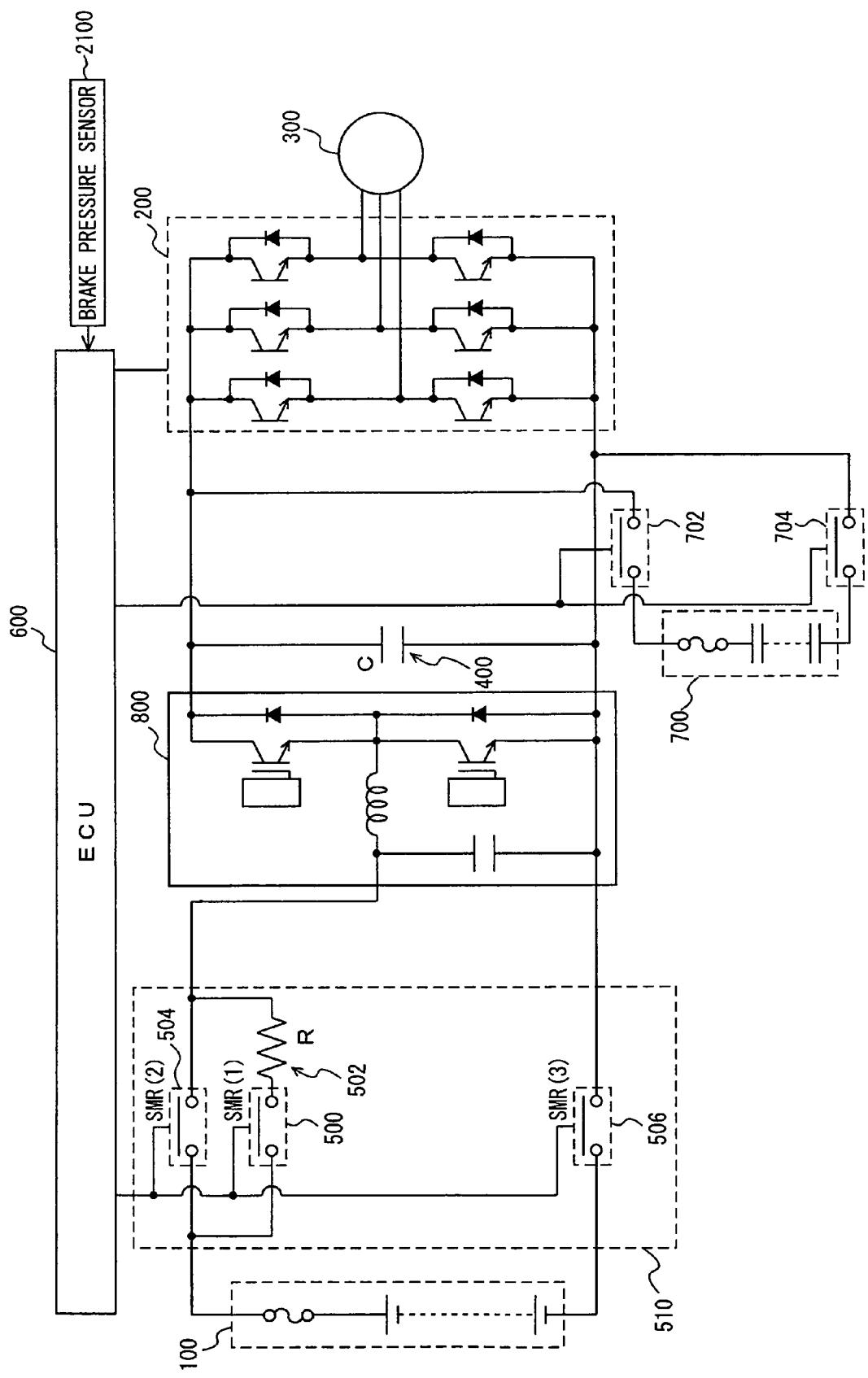
FIG. 1 shows a structure of a vehicle mounting the power controller in accordance with a first embodiment of the present invention.

In the following, an embodiment of the present invention will be described with reference to the figures. In the following description, the same or corresponding portions are denoted by the same reference characters. Their names and functions are also the same. Therefore, detailed description thereof will not be repeated.

First Embodiment

Referring to FIG. 1, the vehicle mounting the power controller in accordance with the embodiment of the present invention will be described. The vehicle includes: a battery 100; an inverter 200; a motor generator 300; a condenser 400; a system main relay 510 (SMR (1) 500, limiting resistor 502, SMR (2) 504, SMR (3) 506); and an ECU (Electronic Control Unit) 600. The power controller in accordance with the present embodiment is controlled by a program executed by ECU 600. In the present embodiment, the vehicle will be described as an electric vehicle that runs only by the driving force from motor generator 300. The vehicle on which power controller of the present invention is mountable is not limited to the electric vehicle, and it may be mounted on a hybrid vehicle, a fuel cell electric vehicle or the like.

Battery 100 is a battery assembly connecting in series a plurality of modules, each including a plurality of cells connected in series. In addition to battery 100, a capacitor 700 is provided and power is supplied from these to motor generator 300, in accordance with respective characteristics.

Inverter 200 includes six IGBTs (Insulated Gate Bipolar Transistors), and six diodes connected in parallel with the IGBTs respectively, to cause current flow from the emitter side to the collector side of the IGBT.

Based on a control signal from ECU 600, inverter 200 causes motor generator 300 to function as a motor or a generator. When motor generator 300 is caused to function as a motor, inverter 200 converts the DC power supplied from battery 100 or capacitor 700 to AC power, and supplies the converted power to motor generator 300. Inverter 200 regulates the power to be supplied to motor generator 300 by turning on/off (rendering conductive/non-conductive) the gate of each IGBT such that motor generator 300 attains to the output state required by the control signal from ECU 600.

When motor generator 300 is caused to function as a generator, inverter 200 converts the AC power generated by motor generator 300 to DC power, and charges battery 100 or capacitor 700 with this power. Inverter 200 controls the electric power (regenerative power) generated by motor generator 300 by turning on/off (rendering conductive/non-conductive) the gate of each IGBT, so that the regenerative braking force (regenerative torque) required by the control signal from ECU 600 acts on the vehicle.

Motor generator 300 is a three-phase AC motor and a generator generating electric power at the time of regenerative braking of the vehicle. Rotation shaft of motor generator 300 is eventually connected to a drive shaft (not shown). The vehicle runs receiving the driving force from motor generator 300.

Condenser 400 is connected in parallel with inverter 200. Condenser 400 temporarily stores electric charges, in order to smooth the electric power supplied from battery 100 or electric power supplied from inverter 200. The smoothed electric power is supplied to inverter 200 or battery 100.

System main relay 510 includes SMR (1) 500 and SMR (2) 504 on the positive electrode side, and SMR (3) 506 on the negative electrode side. SMR (1) 500, SMR (2) 504 and SMR (3) 506 are relays of which on-contact is closed when excitation current is caused to flow through the coil. SMR (1) 500 and SMR (2) 504 are provided on the positive electrode side of battery 100. SMR (1) 500 and SMR (2) 504 are connected in parallel. SMR (1) 500 has limiting resistor 502 connected in series thereto. SMR (1) 500 is a precharging SMR connected before SMR (2) 504 is connected, to prevent flow of rush current to inverter 200. SMR (2) 504 is a positive side SMR connected after SMR (1) 500 is connected and precharging is completed. SMR (3) 506 is a negative side SMR provided on the negative electrode side of battery 100. Each SMR is controlled by ECU 600.

At the time of power on (when the position of ignition switch is changed from OFF to STA position), ECU 600 first turns on SMR (3) 506, and then turns on SMR (1) 500 to execute precharging. As the limiting resistor 502 is connected to SMR (1) 500, the voltage that acts on the inverter 200 increases moderately even when SMR (1) 500 is turned on, and thus, generation of rush current can be prevented. After precharging, ECU 600 turns on SNR (2) 504. At the time of power off (when the position of ignition switch is changed from STA to OFF position), ECU 600 turns off SMR (1) 500, SMR (2) 504 and SMR (3) 506, to prevent, for example, leakage from battery 100.

Further, as described above, the vehicle mounts capacitor 700 in addition to battery 100. Capacitor 700 is connected between the input side terminal of inverter 200 and condenser 400. Capacitor 700 includes relays 702 and 704 of which on-contacts is closed when excitation current is caused to flow to the coil, of which opening/closing is controlled by ECU 600 to charge/discharge power to/from inverter 200. At the time of power on, relays 702 and 704 are turned on. At the time of power off, relays 702 and 704 are turned off, to prevent, for example, leakage from capacitor 700.

Capacitor 700 has larger rated charging/discharging electric power than battery 100, and it can respond to instantaneous high input/output. Capacitor 700 has smaller storage capacity than battery 100 and, at the time of charging with regenerative energy, it reaches fully charged state in a short period of time.

Further, the vehicle is provided with a boost converter 800, between battery 100 and inverter 200. At the time of vehicle acceleration, rated voltage (of about 200V) of battery 100 is boosted to about 500V (rated voltage of motor generator 300) by boost converter 800, and supplied to inverter 200. At the time of regenerative braking of the vehicle, the regenerative voltage of about 500V converted to DC voltage by inverter 200 is lowered to the rated voltage of battery 100, and supplied to battery 100. Boost converter 800 is formed of two IGBTs and a reactor for reducing current variation.

Further, the vehicle is provided with a brake pressure sensor 2100 connected to ECU 600. Brake pressure sensor 2100 detects brake pressure that corresponds to the stepping force of brake pedal (not shown) by the driver, and transmits a signal indicating the brake pressure to ECU 600.

ECU 600 executes a program stored in an ROM (Read Only Memory) based on signals transmitted from the ignition switch (not shown), a pedal stepping sensor (not shown) of accelerator pedal, brake pressure sensor 2100 and the like. This program controls inverter 200, boost converter 800, SMRs and the like, whereby the vehicle is controlled to run in a desired state.

In the present embodiment, charging/discharging of battery 700 and capacitor 900 is controlled by changing the output voltage (system voltage) of boost converter 800.

By way of example, assume that electric power is to be supplied to motor generator 300. Here, if the output voltage of boost converter 800 is made lower than the voltage of capacitor 700, capacitor 700 is discharged with priority. If the output voltage of boost converter 800 is set equal to or higher than the voltage of capacitor 700, battery 100 is discharged with priority.

On the other hand, when the electric power generated by motor generator 300 at the time of regenerative braking is to be stored in battery 100 or capacitor 700 and if the output voltage of boost converter 800 is set equal to or lower than the voltage value of capacitor 700, battery 100 is charged with priority. If the output voltage of boost converter 800 is set higher than the voltage of capacitor 700, capacitor 700 is charged with priority.

Further, ECU 600 calculates the limit value of charging power to the battery WIN(B) (maximum power to be stored in battery 100), based on the temperature, state of charge and the like of battery 100. Similarly, ECU 600 calculates the limit value of charging power to the capacitor WEN(C) (maximum power to be stored in capacitor 700), based on the temperature, voltage and the like of capacitor 700. The limit charging power WIN(B) and limit charging power WIN(C) are calculated not to exceed respective rated charging power values.

Figure 2:
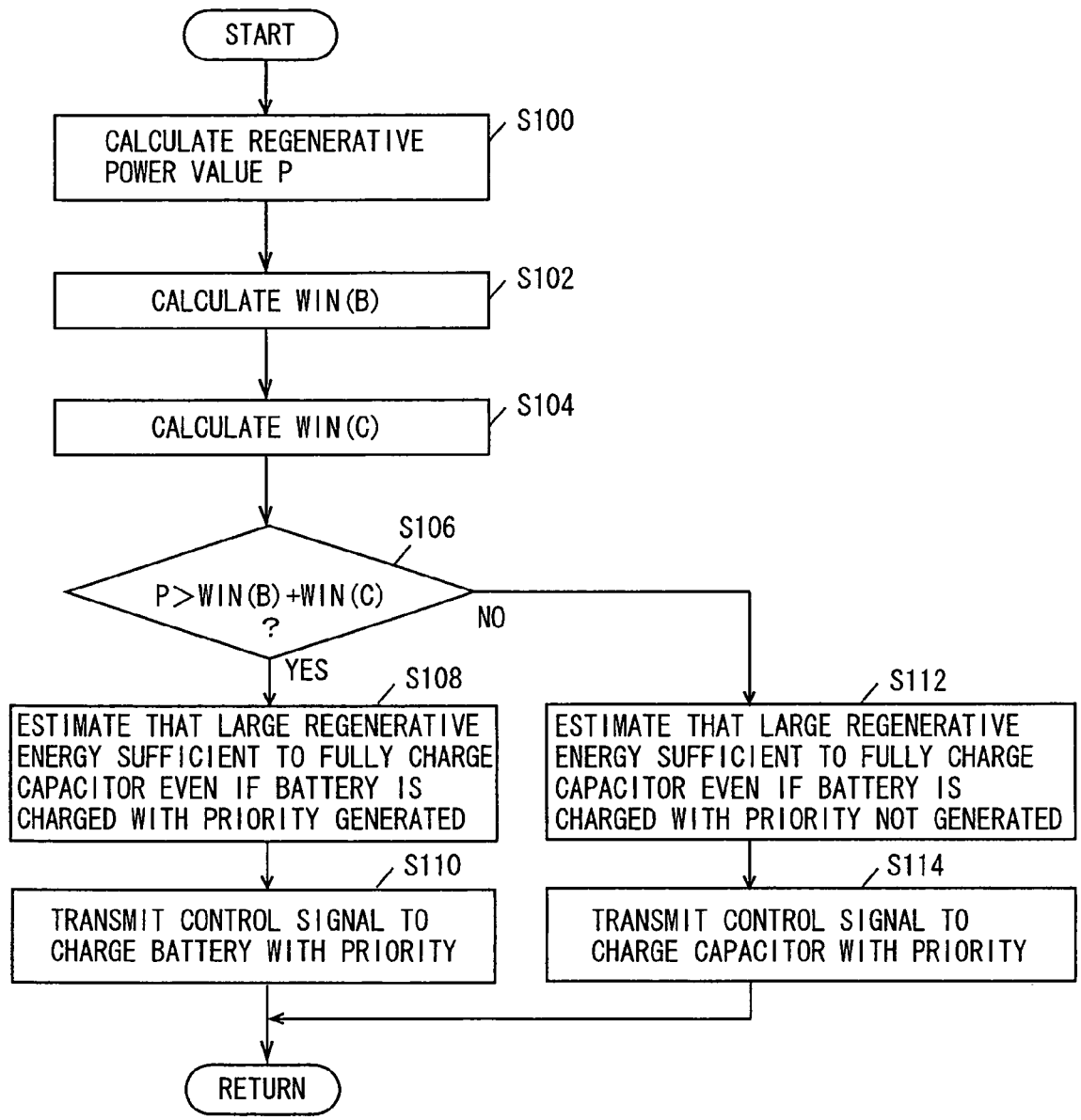
FIG. 2 is a flowchart representing a control structure of an ECU implementing the power controller in accordance with the first embodiment of the present invention.

Referring to FIG. 2, control structure of the program executed by ECU 600 implementing the power controller in accordance with the present embodiment will be described.

Figure 3:
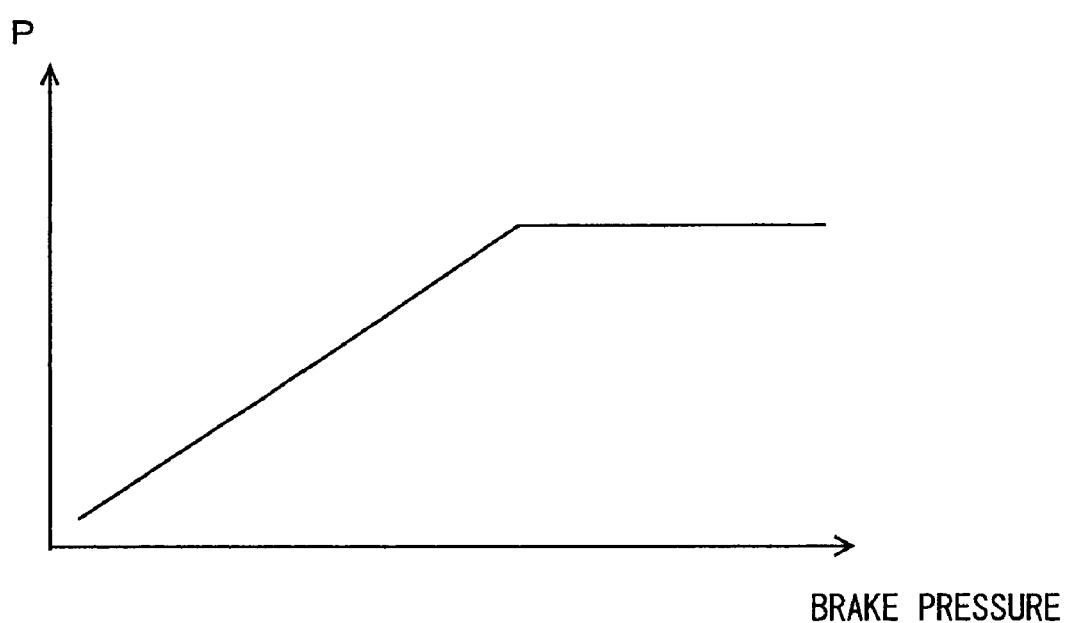
FIG. 3 shows a relation between brake pressure and regenerative power value in the vehicle mounting the power controller in accordance with the first embodiment of the present invention.

At step (hereinafter "step" will be denoted as "S") 100, ECU 600 calculates regenerative power value P from a signal transmitted from brake pressure sensor 2100. By way of example, the regenerative power value P is calculated based on a map such as shown in FIG. 3, in which the regenerative power value P is stored in advance in correspondence with brake pressure as a parameter.

At S102, ECU 600 calculates the limit charging power WIN(B) to the battery, based on the temperature, state of charge and the like of battery 100.

At S104, ECU 600 calculates the limit charging power WIN(C) to the capacitor, based on the temperature, voltage and the like of capacitor 700.

At S106, ECU 600 determines whether the regenerative power value P is larger than the sum of limit charging power WIN(B) to the battery and the limit charging power WIN(C) to the capacitor. If it is determined to be larger (YES at S106), the process proceeds to S108, and if not (NO at S106), the process proceeds to S112.

At S108, ECU 600 estimates that large regenerative energy sufficient to fully charge the capacitor 700 even if battery 100 is charged with priority would be generated. At this step, ECU 600 may estimate that a large regenerative energy sufficient to charge the capacitor 700 with the same amount of electric energy as when capacitor 700 is charged with priority, even if battery 100 is charged with priority, is generated.

At S110, ECU 600 transmits a control signal to set the output voltage of boost converter 800 to be not larger than the voltage of capacitor 700, so that battery 100 is charged with priority.

At S112, ECU 600 estimates that the large regenerative energy sufficient to fully charge the capacitor 700 even if battery 100 is charged with priority would not be generated. At this step, ECU 600 may estimate that a large regenerative energy sufficient to charge the capacitor 700 with the same amount of electric energy as when capacitor 700 is charged with priority, even if battery 100 is charged with priority, would not be generated.

At S114, ECU 600 transmits a control signal to set the output voltage of boost converter 800 to be higher than the voltage of capacitor 700 so that capacitor 700 is charged with priority.

An operation of ECU 600 according to the present embodiment based on the above-described configuration and flowchart will be described.

Figure 4:
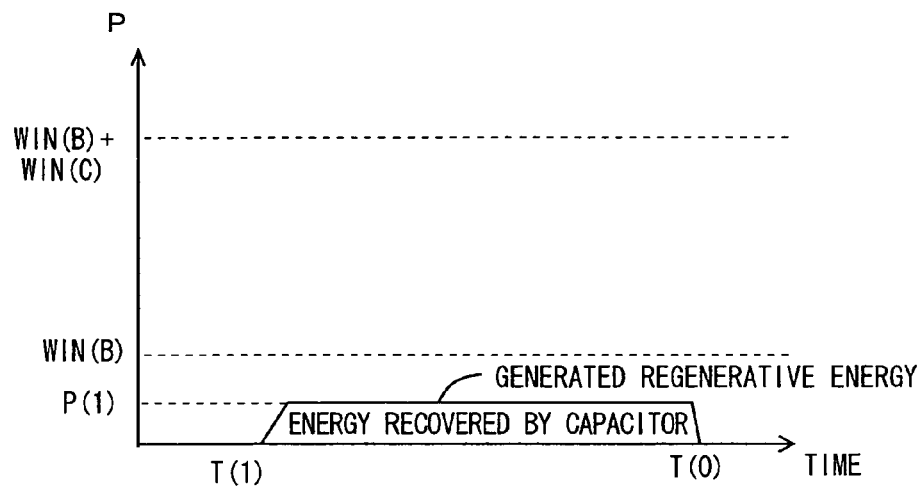
FIG. 4 is a (first) timing chart representing charging power values of the capacitor and the battery in the vehicle mounting the power controller in accordance with the first embodiment of the present invention.

First, assume that such a regenerative energy as shown in FIG. 4 is generated. The regenerative energy shown in FIG. 4 generates from time T(1) to T(0), and the regenerative power value P is smaller than the limit charging power WIN(B) to the battery. If the battery 100 is charged with priority in this situation, the regenerative energy will be fully stored in battery 100, and capacitor 700 will not be charged. Therefore, the regenerative power value P(1) is calculated based on the brake pressure (S100), and as the regenerative power P(1) is smaller than the sum of limit charging power to the battery WIN(B) and the limit charging power WIN(C) to the capacitor (NO at S106), it is estimated that large regenerative energy would not be generated (S112). Thus, capacitor 700 is charged with priority (S114). In this manner, capacitor 700 can be charged with the generated regenerative energy. Thus, capacitor 700 can be charged in advance to be ready for instantaneous high output at the time of acceleration and, hence, satisfactory acceleration performance can be attained.

Figure 5:
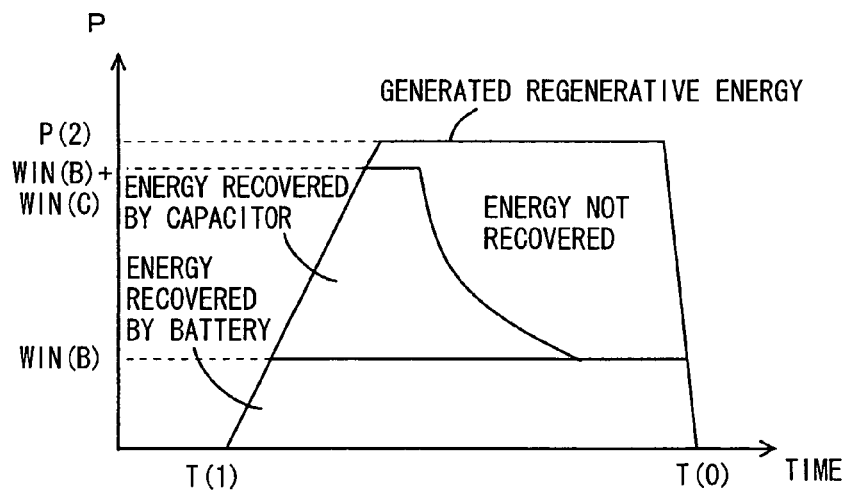
FIG. 5 is a (second) timing chart representing charging power values of the capacitor and the battery in the vehicle mounting the power controller in accordance with the first embodiment of the present invention.

Next, assume that such a regenerative energy as shown in FIG. 5 is generated. The regenerative energy shown in FIG. 5 generates from T(1) to T(0), and the regenerative power value P is larger than the sum of limit charging power to the battery WIN(B) and the limit charging power WIN(C) to the capacitor. In such a situation, even if battery 100 is charged with priority, capacitor 700 could be fully charged by the extra power that cannot be stored in battery 100.

Figure 6:
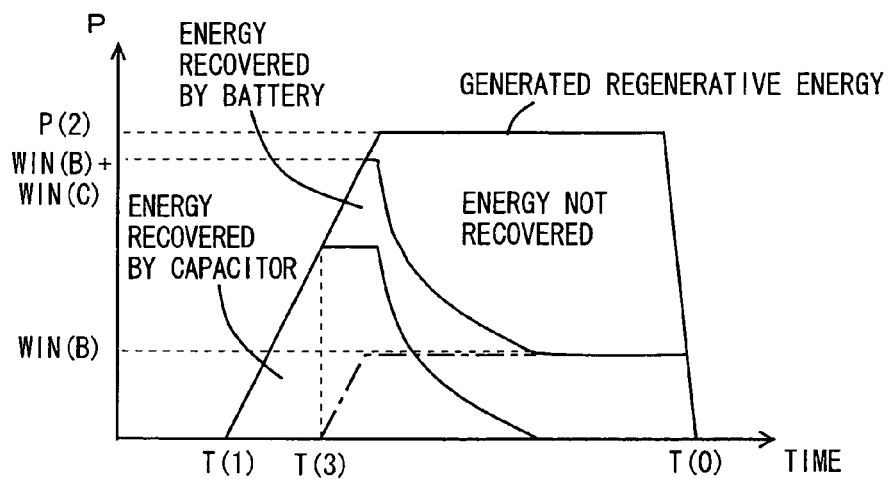
FIG. 6 is a timing chart of the charging power values of the capacitor and the battery of a vehicle not mounting the power controller in accordance with the present invention.

If capacitor 700 should be charged with priority even in such a situation, charging to capacitor 700 is given priority and the start time of charging to battery 100 delays from T(1) to T(3) as shown in FIG. 6, and the amount of charges in battery 100 decreases. Chain dotted line in FIG. 6 represents only the regenerative energy that is recovered by battery 100, when capacitor 700 is charged with priority. It is noted that no matter which of battery 100 and capacitor 700 is charged with priority, the amount of charges stored in capacitor 700 is the same, and the capacitor can be fully charged. Therefore, the overall amount of recovery of the regenerative energy decreases.

Accordingly, a regenerative power value P(2) is calculated based on the brake pressure (S100). Since the regenerative power value P(2) is larger than the sum of limit charging power to the battery WIN(B) and the limit charging power WIN(C) to the capacitor (YES at S1106), it is estimated that a large regenerative energy would be generated (S108), and the battery 100 is charged with priority (S110).

Therefore, as compared with the approach in which capacitor 700 is charged with priority, it becomes possible to set earlier the start time of charging battery 100 from T(3) to T(1) as shown in FIG. 5, while capacitor 700 is fully charged with the same amount of electric energy. Therefore, it is possible to charge battery 100 with larger amount of regenerative energy. Thus, maximum regenerative energy can be recovered while ensuring satisfactory acceleration performance.

As described above, according to the power controller of the present embodiment, if the regenerative power value calculated based on the brake pressure is larger than the sum of limit charging power to the battery and the limit charging power to the capacitor, the battery is charged with priority. Therefore, as compared with the approach in which the capacitor is charged with priority, it is possible to charge the battery with larger amount of regenerative energy by setting earlier the start time of charging the battery, while the capacitor is fully charged with the same amount of electric energy. Thus, it is possible to prevent decrease in the amount of recovered regenerative energy while ensuring sufficient acceleration performance.

In the present embodiment, whether a large regenerative energy is generated or not is estimated (S108, S112) based on a result of comparison (S106) between the regenerative power value P and the sum of limit charging power WIN(B) to the battery and the limit charging power WIN(C) to the capacitor, in the flowchart of FIG. 2. The method of determining whether large regenerative power would be generated or not is not limited to this. By way of example, a threshold value determined based on the rated charging power of battery 100 and rated charging power of capacitor 700 may be stored, and whether a large regenerative power would be generated or not may be estimated based on a result of comparison between the regenerative power value P and the threshold value.

Second Embodiment

A power controller in accordance with the present embodiment will be described. The power controller of the present embodiment differs from the structure of power controller in accordance with the first embodiment described above in that it includes a navigation device 2200 and an ECU 1600, in place of brake pressure sensor 2100 and ECU 600. ECU 1600 differs from ECU 600 implementing the power controller in accordance with the first embodiment only in the control structure of the program. Except for these points, the structure is the same as the power controller in accordance with the first embodiment described above. The same components are denoted by the same reference characters. Their functions are also the same. Therefore, detailed description thereof will not be repeated here.

Figure 7:
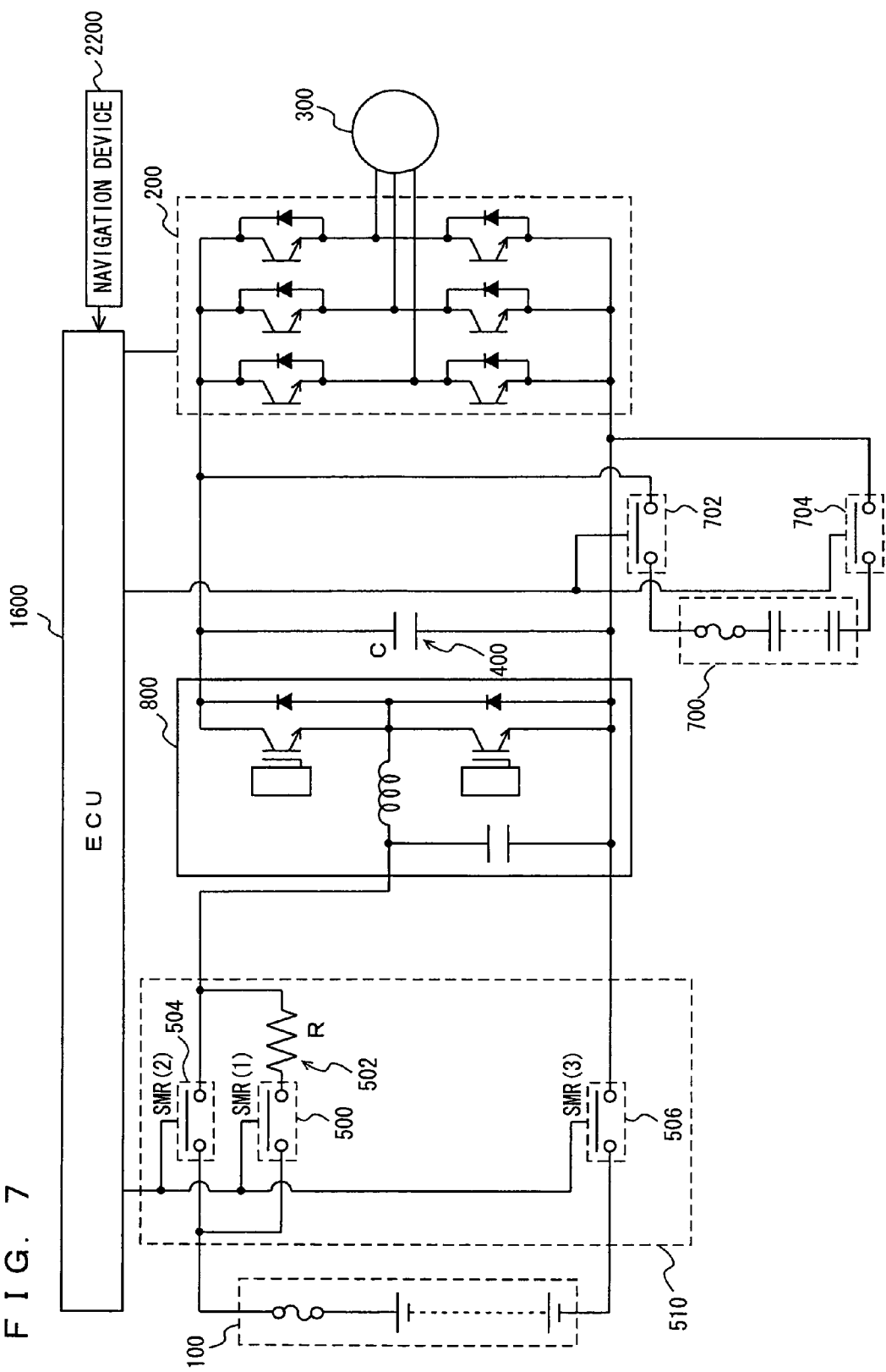
FIG. 7 shows a configuration of a vehicle mounting the power controller in accordance with the second embodiment of the present invention.

Referring to FIG. 7, the vehicle mounting the power controller in accordance with the present embodiment will be described.

Navigation device 2200 calculates vehicle running information based on position information of the vehicle itself received from a satellite of GPS (Global Positioning System). The vehicle running information includes running position information on a map of the vehicle, based on map data recorded on navigation device 2200. This allows calculation of gradient information of the road ahead of the vehicle. Navigation device 2200 transmits a signal indicating the calculated vehicle running information to ECU 1600.

Referring to FIG. 8, control structure of the program executed by ECU 1600 implementing the power controller in accordance with the present embodiment will be described. In the flowchart of FIG. 8, the same process steps as in the flowchart of FIG. 2 are denoted by the same step numbers. Processes of these steps are the same. Therefore, detailed description thereof will not be repeated here.

At S200, ECU 1600 obtains the vehicle running information calculated by navigation device 2200.

At S202, ECU 1600 determines whether a downhill slope of a predetermined gradient or steeper continues for a predetermined distance or more, based on the vehicle running information obtained from navigation device 2200. If it is determined to continue (YES at S202), the process proceeds to S108. If not (NO at S202), the process proceeds to S12.

By the ECU 1600 implementing the power controller in accordance with the present embodiment, whether the downhill slope of a predetermined gradient or steeper continues for a predetermined distance or more is determined based on the vehicle running information obtained from navigation device 2200 (S202). While the vehicle is running a downhill slope of a steep inclination for a long distance, large regenerative force corresponding to the steep inclination is often required by the driver. Specifically, it is often the case that large regenerative power continues for a long period of time, generating large regenerative energy. Therefore, if it is determined that the downhill slope of a predetermined gradient or steeper continues for a predetermined distance or more (YES at S202), it is estimated that large regenerative power would be generated (S108), and battery 100 is charged with priority (S110). Consequently, similar to the first embodiment, as compared with the approach in which the capacitor 700 is charged with priority, it is possible to charge the battery 100 with larger amount of regenerative energy by setting earlier the start time of charging the battery 100, while the capacitor is fully charged with the same amount of electric energy.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power controller for a vehicle including a rotating electric machine for running that generates regenerative power of a voltage higher than rated voltage of a secondary battery at the time of braking, comprising:
    an inverter connected to said rotating electric machine and converting and outputting said regenerative power;
    a converter connected between said inverter and said secondary battery, converting the voltage of said converted regenerative power to a rated voltage of said secondary battery and outputting the resulting voltage;
    a capacitor connected between said converter and said inverter in parallel with said secondary battery, having larger rated charging/discharging power and smaller storage capacity than said secondary battery;
    a switching unit switched to charge either said secondary battery or said capacitor with priority; and
    an operation unit connected to said switching unit; wherein
    said operation unit determines whether said regenerative power is not lower than a predetermined value, and controls said switching unit such that said secondary battery is charged with priority if it is determined to be not lower than said predetermined value, and said capacitor is charged with priority if it is determined to be lower than said predetermined value.

2. The power controller according to claim 1, wherein said predetermined value is set based on a first upper limit control value of charging power to said secondary battery and a second upper limit control value of charging power to said capacitor.

3. The power controller according to claim 2, wherein said predetermined value is set to be a sum of said first upper limit control value and said second upper limit control value.

4. The power controller according to claim 1, wherein said operation unit further calculates said regenerative power based on brake pressure of said vehicle.

5. A power controller for a vehicle including a rotating electric machine for running that generates regenerative power of a voltage higher than rated voltage of a secondary battery at the time of braking, comprising:
- an inverter connected to said rotating electric machine and converting and outputting said regenerative power;
- a converter connected between said inverter and said secondary battery, converting the voltage of said converted regenerative power to a rated voltage of said secondary battery and outputting the resulting voltage;
- a capacitor connected between said converter and said inverter in parallel with said secondary battery, having larger rated charging/discharging power and smaller storage capacity than said secondary battery;
- a switching unit switched to charge either said secondary battery or said capacitor with priority; and
- an operation unit connected to said switching unit; wherein said operation unit estimates whether a large regenerative energy sufficient to charge said capacitor with electric energy not smaller than a predetermined value, even if said secondary battery is charged with priority, would be generated, and controls said switching unit such that said secondary battery is charged with priority if it is estimated that said large regenerative energy would be generated, and said capacitor is charged with priority if it is estimated that said large regenerative energy would not be generated.

6. The power controller according to claim 5, wherein said predetermined value is a value sufficient to output electric power corresponding to a request of a driver of said vehicle.

7. The power controller according to claim 5, wherein said operation unit further calculates said regenerative power based on brake pressure of said vehicle, and estimates whether said large regenerative energy would be generated or not based on said calculated regenerative power.

8. The power controller according to claim 7, wherein said operation unit estimates whether said large regenerative energy would be generated or not based on a first upper limit control value of charging power to said secondary battery and a second upper limit control value of charging power to said capacitor, in addition to said calculated regenerative power.

9. The power controller according to claim 8, wherein said operation unit estimates that said large regenerative energy would be generated if said calculated regenerative power value is larger than a sum of said first upper limit control value and said second upper limit control value.

10. The power controller according to claim 5, wherein said operation unit estimates whether said large regenerative energy would be generated based on information from a navigation device.

11. A power controller for a vehicle including a rotating electric machine for running that generates regenerative power of a voltage higher than rated voltage of a secondary battery at the time of braking, comprising:
- an inverter connected to said rotating electric machine and converting and outputting said regenerative power;
- a converter connected between said inverter and said secondary battery, converting the voltage of said converted regenerative power to a rated voltage of said secondary battery and outputting the resulting voltage;
- a capacitor connected between said converter and said inverter in parallel with said secondary battery, having larger rated charging/discharging power and smaller storage capacity than said secondary battery;
- switching means switched to charge either said secondary battery or said capacitor with priority;
- means for determining whether said regenerative power is not lower than a predetermined value; and
- control means for controlling said switching means such that said secondary battery is charged with priority if it is determined to be not lower than said predetermined value, and said capacitor is charged with priority if it is determined to be lower than said predetermined value.

12. The power controller according to claim 11, wherein said predetermined value is set based on a first upper limit control value of charging power to said secondary battery and a second upper limit control value of charging power to said capacitor.

13. The power controller according to claim 12, wherein said predetermined value is set to be a sum of said first upper limit control value and said second upper limit control value.

14. The power controller according to claim 11, further comprising
means for calculating said regenerative power based on brake pressure of said vehicle.

15. A power controller for a vehicle including a rotating electric machine for running that generates regenerative power of a voltage higher than rated voltage of a secondary battery at the time of braking, comprising:
- an inverter connected to said rotating electric machine and converting and outputting said regenerative power;
- a converter connected between said inverter and said secondary battery, converting the voltage of said converted regenerative power to a rated voltage of said secondary battery and outputting the resulting voltage;
- a capacitor connected between said converter and said inverter in parallel with said secondary battery, having larger rated charging/discharging power and smaller storage capacity than said secondary battery;
- switching means switched to charge either said secondary battery or said capacitor with priority;
- estimating means for estimating whether a large regenerative energy sufficient to charge said capacitor with electric energy not smaller than a predetermined value, even if said secondary battery is charged with priority, would be generated, and
- control means for controlling said switching means such that said secondary battery is charged with priority if it is estimated that said large regenerative energy would be generated, and said capacitor is charged with priority if it is estimated that said large regenerative energy would not be generated.

16. The power controller according to claim 15, wherein said predetermined value is a value sufficient to output electric power corresponding to a request of a driver of said vehicle.

17. The power controller according to claim 15, further comprising
means for calculating said regenerative power based on brake pressure of said vehicle; wherein
said estimating means includes means for estimating whether said large regenerative energy would be generated or not based on said calculated regenerative power.

18. The power controller according to claim 17, wherein said estimating means includes means for estimating whether said large regenerative energy would be generated or not based on a first upper limit control value of charging power to said secondary battery and a second upper limit control value of charging power to said capacitor, in addition to said calculated regenerative power.

19. The power controller according to claim 18, wherein said estimating means includes means for estimating that said large regenerative energy would be generated if said calculated regenerative power value is larger than a sum of said first upper limit control value and said second upper limit control value.

20. The power controller according to claim 15, wherein said estimating means includes means for estimating whether said large regenerative energy would be generated based on information from a navigation device.

* * * * *